United States Patent
Gill

(10) Patent No.: US 7,248,447 B2
(45) Date of Patent: Jul. 24, 2007

(54) HIGH HC PINNED SELF-PINNED SENSOR

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 295 days.

(21) Appl. No.: 10/840,452

(22) Filed: May 5, 2004

(65) Prior Publication Data

US 2005/0249979 A1 Nov. 10, 2005

(51) Int. Cl.
*G11B 5/39* (2006.01)
*G11B 5/127* (2006.01)

(52) U.S. Cl. .............. 360/324.11; 428/811.2; 428/812

(58) Field of Classification Search ............ None
See application file for complete search history.

(56) References Cited

U.S. PATENT DOCUMENTS

| | | | |
|---|---|---|---|
| 5,738,938 A | 4/1998 | Kawano et al. | 428/332 |
| 6,022,633 A * | 2/2000 | Hayashi et al. | 428/811.2 |
| 6,538,919 B1 | 3/2003 | Abraham et al. | 365/171 |
| 6,683,762 B2 | 1/2004 | Li et al. | 360/324.11 |
| 6,917,492 B2 * | 7/2005 | Matsukawa et al. | 360/110 |
| 2002/0085320 A1 * | 7/2002 | Gill | 360/324.11 |
| 2003/0184921 A1 | 10/2003 | Sugita et al. | 360/324.1 |
| 2003/0227723 A1 | 12/2003 | Li et al. | 360/324.11 |
| 2004/0184197 A1 * | 9/2004 | Zheng et al. | 360/324.1 |
| 2004/0190204 A1 * | 9/2004 | Yoshikawa et al. | 360/324.1 |
| 2005/0111148 A1 * | 5/2005 | Li et al. | 360/324.12 |
| 2005/0184839 A1 * | 8/2005 | Nguyen et al. | 335/173 |

OTHER PUBLICATIONS

Smith, N. and Cain, W., "Micromagnetic model of an exchange coupled NiFe-TbCo bilayer", J. App. Phys., 69(4), 1991, 2471-2479.*

H. Boeve, H.A.M. van den Berg, R. Mattheis, W. Michalke, G. Rupp, J. Wecker, Enhanced uniaxial anisotropy in an artificial antiferromagnet (AAF) using thin TbCo seed layers, 2002, Journal of Magnetism and Magnetic Materials.

* cited by examiner

*Primary Examiner*—Kevin M. Bernatz
(74) *Attorney, Agent, or Firm*—Zilka-Kotab, PC

(57) ABSTRACT

A self pinned magnetoresistive sensor having an anitparallel coupled pinned layer structure including a high coercivity (high Hc) layer of TbCo.

18 Claims, 4 Drawing Sheets

HIGH HC PINNED SELF-PINNED SENSOR

FIELD OF THE INVENTION

The present invention relates to giant magnetoresistive (GMR) sensors and more particularly to a novel pinning structure for a current perpendicular to plane (CPP) GMR sensor.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of a rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

A spin valve sensor is characterized by a magnetoresistive (MR) coefficient that is substantially higher than the MR coefficient of an anisotropic magnetoresistive (AMR) sensor. For this reason a spin valve sensor is sometimes referred to as a giant magnetoresistive (GMR) sensor. When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Sensors can also be categorized as current in plane (CIP) sensors or as current perpendicular to plane (CPP) sensors. In a CIP sensor, current flows from one side of the sensor to the other side parallel to the planes of the materials making up the sensor. Conversely, in a CPP sensor the sense current flows from the top of the sensor to the bottom of the sensor perpendicular to the plane of the layers of material making up the sensor. In a CPP sensor design, the magnetic shields usually double as electrical leads for supplying a sense current to the sensor. Therefore, in CPP sensor design, the shields/leads contact the top and bottom of the sensor, and the space between the shields defines the length of a bit of data.

The ever increasing demand for data storage density and data rate have increasingly pushed the limits of data storage designs. Recently in efforts to overcome such limits, engineers and scientists have focused on the use of perpendicular recording. In a perpendicular recording system a write pole emits a highly concentrated magnetic field that is directed perpendicular to the surface of the medium (eg. the disk). This field in turn magnetizes a localized portion of the disk in a direction perpendicular to the surface of the disk, thereby creating a bit of data. The resulting flux travels through the disk to a return path having a much larger area than the area in which the bit was recorded. The increased interest in perpendicular recording has lead to an increased interest in current perpendicular to plane (CPP) sensors, which are particularly suited to use in perpendicular recording.

Ever increasing demands for increased data density and data rate have also pushed sensor designs to decrease the size of a bit of data in order to fit more bits onto a given length of data track. This requires shrinking the distance between the shields of the sensor to decrease the length of the data bits that can be read by the sensor. One method used to reduce this length between shields (or gap height) has been to eliminate the antiferromagnei (AFM) pinning layer used to maintain the magnetization of the pinned layer. As discussed above, sensor designs have used a layer of AFM material to set the pinning of the pinned layer of a sensor. This saves a great deal of gap budget, because in order for an AFM layer to effectively set the pinning of a pinned layer, the AFM must be constructed very thick. In fact the AFM is usually much thicker than many of the other layers of the sensor combined.

In order to eliminate the AFM layer, sensors have been recently designed as "self pinned" sensors, wherein a pair of antiparallel pinned layers having a strong positive magnetostriction are pinned by a combination of positive magnetostriction and compressive forces present in the sensor. One problem that has arisen as a result of such self pinning designs is that the pinned layers can be prone to flipping. The positive magnetostriction tends to keep the magnetization of AP pinned layers oriented in a desired orientation perpendicular to the ABS of the sensor. However, if the sensor undergoes a stress, such as a heat spike or a mechanical deformation during head disk contact, the pinned layers can momentarily loose their magnetostriction induced pinning and can change orientation, an event referred to as amplitude flipping. This renders the sensor unusable.

Therefore, there remains a need for a design that can reduce the gap height (distance between shields/leads) such as by eliminating the use of an AFM layer, while also achieving robust pinning. Such a design would preferably be useable in a CPP sensor design since such sensors have promising futures for use in future perpendicular recording systems.

SUMMARY OF THE INVENTION

The present invention provides a self pinned sensor having improved pinned layer robustness. The sensor includes a free layer, a pinned layer structure and a spacer or barrier layer disposed between the free layer and the pinned layer structure. The pinned layer structure includes a first magnetic layer (AP1) and a second layer (AP2), which are antiparallel coupled across a non-magnetic, antiparallel coupling layer. The AP1 layer is constructed of a magnetic material, which can be for example CoFe. The AP2 layer is constructed of a first sublayer comprising a magnetic material such as for example CoFe and a second sublayer that comprises TbCo.

The presence of the TbCo layer advantageously greatly increases the magnetic coercivity (Hc) of the AP2 layer, providing substantial protection against amplitude flipping during a catastrophic event such as a head disk contact. As discussed above, in a self pinned head, pinning is maintained by a combination of high positive magnetostriction of the pinned layer materials and compressive stresses in the sensor which magnetize the magnetic layers of the pinned layer perpendicular to the ABS as desired.

During an event such as a head disk contact, the sensor can be momentarily strained (deformed), which might momentarily eliminate the compressive stresses that maintain the desired pinning. In such case a self pinned sensor could be prone to amplitude flipping during that momentary strain. The present invention advantageously prevents amplitude flipping during such an event by adding substantial coersivity to the AP2 layer which prevents the magnetization of the pinned layer from moving even when the magnetostrictively induced pinning is temporarily removed.

The present invention can be embodied in a current perpendicular to plane (CPP) sensor as well as a current in plane (CIP) sensor and even in a tunnel valve sensor. The invention provides the gap height reduction advantages of using a self pinned sensor (eliminating the AFM layer) while also providing pinned layer robustness, thereby providing a practical high performance self pinned read element. These and other advantages of the invention will be better understood by reading the following detailed description, in conjunction with the figures, which are not to scale and in which like numerals refer to like elements.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
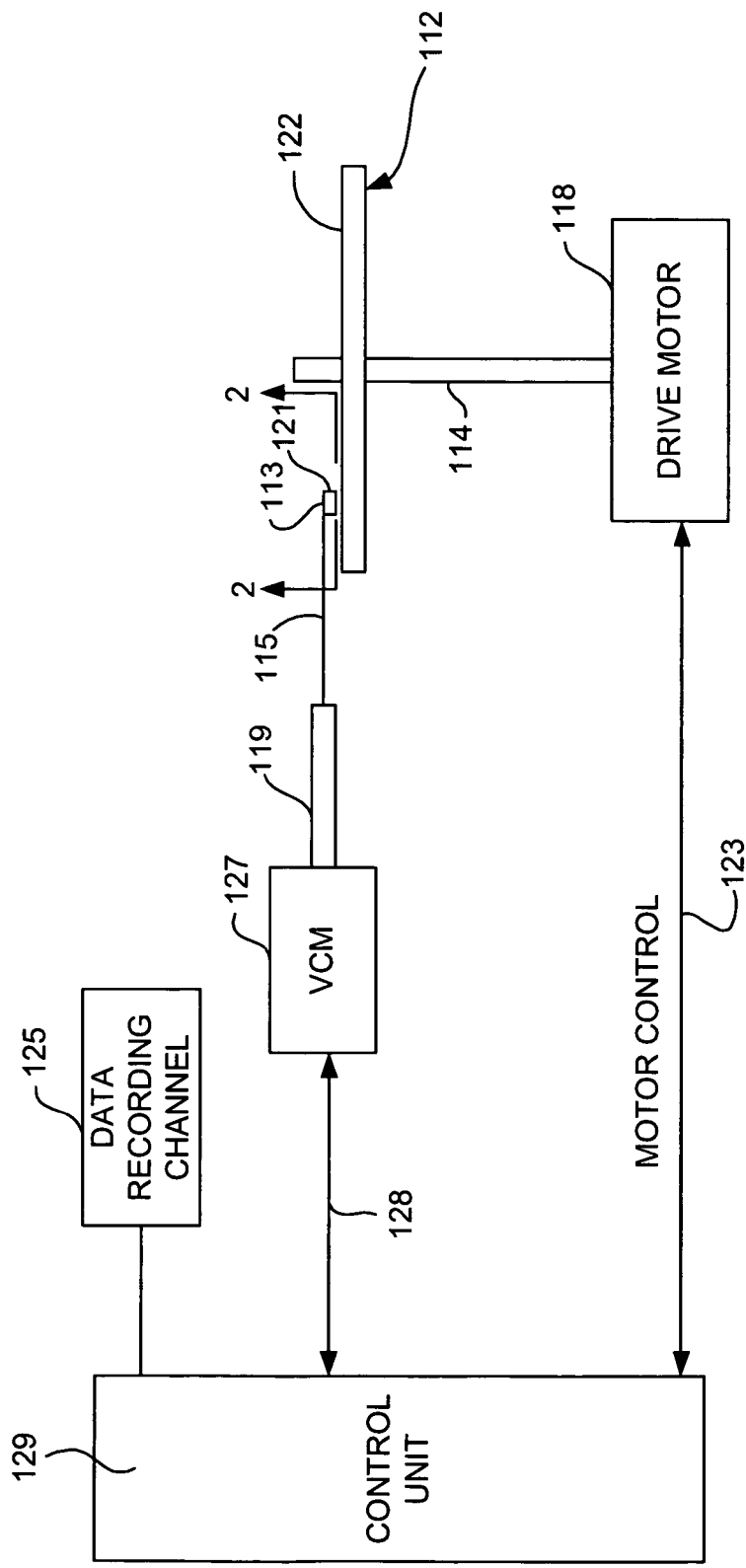
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
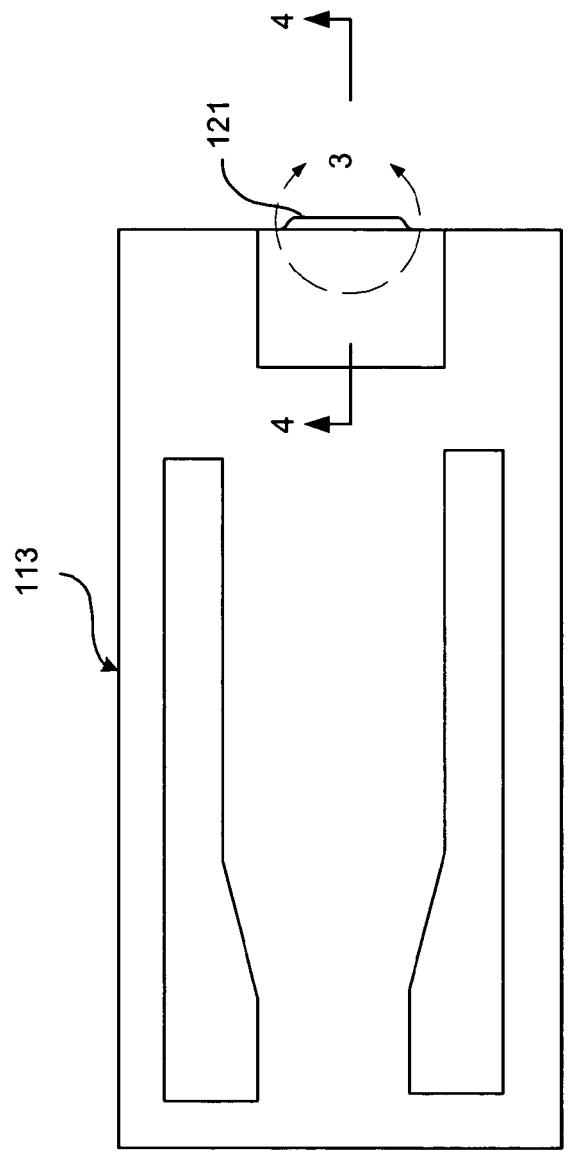
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
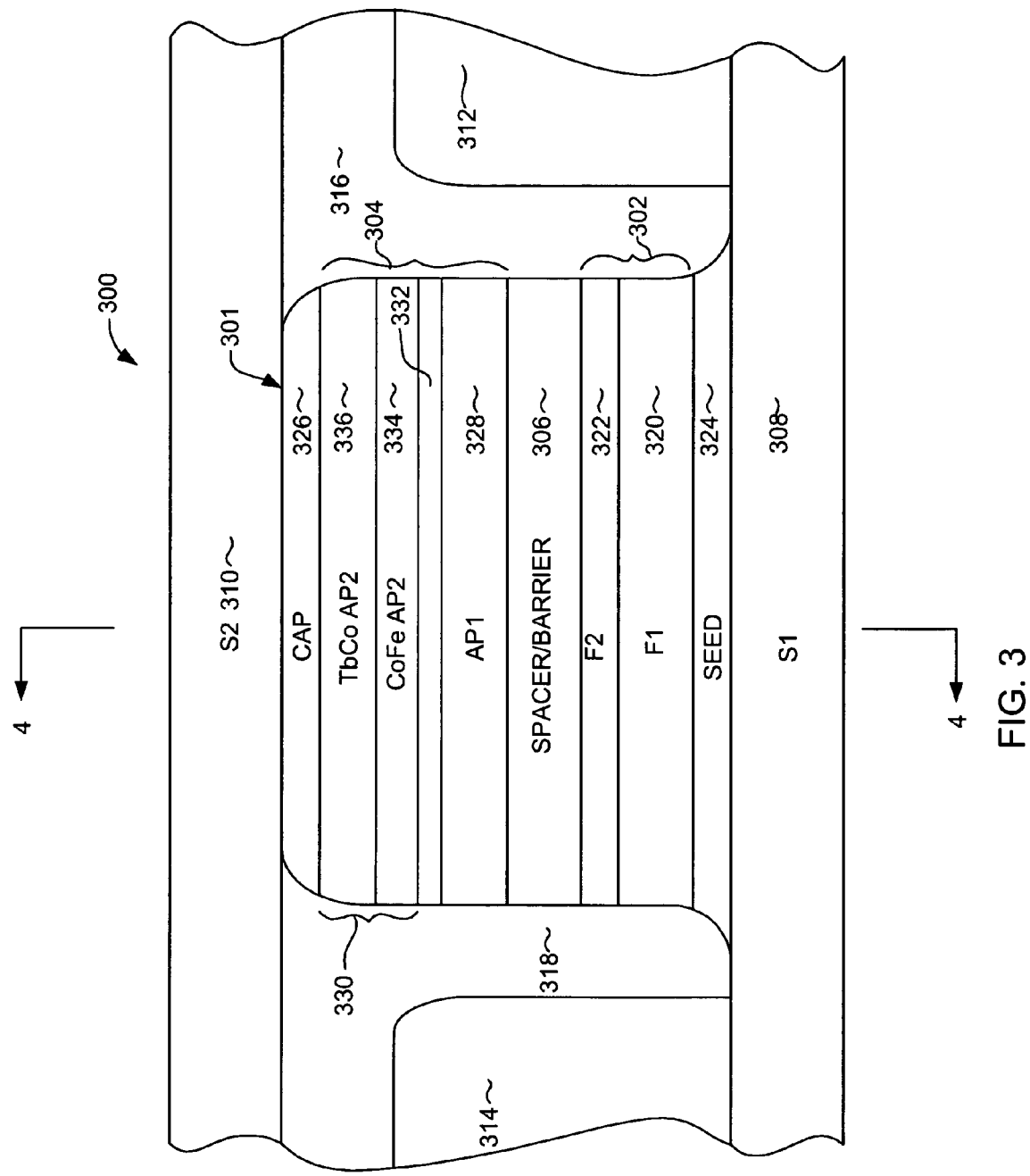
FIG. 3 is an ABS view of a magnetic sensor according to an embodiment of the present invention taken from circle 3 of FIG. 2, shown enlarged and rotated 90 degrees counter-clockwise.

With reference now to FIG. 3, the a magnetoresistive sensor 300 according to an embodiment of the present invention includes a sensor stack 301 having a free layer 302, a pinned layer structure 304 and an electrically conductive spacer layer 306 disposed there between.

It should be pointed out that although the sensor is being described as a giant magnetoresistive sensor (GMR), the present invention could also be practiced in a tunnel valve, in which case the layer 306 would be a non-magnetic, electrically insulating barrier layer such as $Al_2O_3$. It should also be pointed out that the embodiment described herein is being described as a current perpendicular to plane (CPP) sensor. However, the present invention could just as easily be embodied in a current in plane (CIP) sensor, in which case electrical leads (not shown) would be disposed at left and right sides of the sensor to conduct sensor current through the sensor parallel with the planes of the layers.

With continued reference to FIG. 3, the sensor stack 301 is sandwiched between first and second magnetic, electrically conductive shields 308, 310, which serve as both magnetic shields and also as electrical leads. First and second hard bias layers 312, 314 are disposed at either side of the sensor stack 301. The hard bias layers 312, 314 are constructed of a high coercivity (high Hc) magnetic material such as CoPtCr or some other hard magnetic material. The hard bias layers provide a magnetic field that biases the magnetitation of the free layer in a desired direction parallel to the ABS while allowing the magnetization of the free layer to rotate in the presence of a magnetic field such as from a nearby magnetic medium (eg. disk).

First and second electrically insulating layers 316, 318 at either side of the sensor stack 301, separating the hard bias layers 312, 314 from the sensor stack 301 and separating the hard bias layers 312, 314 from at least one of the shields 310. The insulation layers 316, 318 prevent current shunting through the hard bias layers 312, 314 from one shield 308 to the other 310.

With reference still to FIG. 3, the free layer is constructed of a low coercivity (low Hc) material, and may be constructed of multiple layers. For example, the free layer may be constructed of a first free layer sublayer 320 of NiFe, and a second sublayer 322 of CoFe. The free layer could also include a layer of pure Co (not shown). The spacer layer could be constructed of several non-magnetic, electrically conductive materials such as for example Cu.

A seed layer 324 can be provided at the base of the sensor stack 301 such as beneath the free layer 320. The seed layer initiates a desired grain structure (such as face centered cubic (FCC)), which can then be carried though to the other subsequently deposited layers. The seed layer can be for example Ta, NiFeCr, Ru, PtMn or some combination of some or all of these or other materials. At the other top of the sensor stack 301, a capping layer 326 can be provided, to protect the sensor materials from damage, such as by corrosion, during the manufacture of the sensor. The capping layer 326 can be constructed of for example Ta.

With continued reference to FIG. 3, the pinned layer 304 is constructed as an antiparallel pinned structure including a first magnetic layer (AP1) 328. a second magnetic layer (AP2) and a non-magnetic electrically conductive antiparallel coupling layer 332 sandwiched therebetween. The antiparallel coupling layer 332 is constructed of a material such as Ru and is constructed of such a thickness as to antiparallel couple the AP1 and AP2 layers 328, 330. This thickness of the coupling layer 332 could be for example 3 to 9 Angstroms.

The first magnetic layer AP1 328 is preferably constructed of a high magnetostriction magnetic material such as CoFe. This AP1 layer could be 15 to 25 Angstroms thick or about 20 Angstroms thick.

The second magnetic layer AP2 330 includes first and second sublayers 334, 336. The first comprises a magnetic material, which is preferably CoFe. This first sublayer 334 of the AP2 layer 330 could be a CoFe layer having a thickness of about 15 Angstroms or 10 to 20 Angstroms.

The second sublayer 336 of the AP2 layer 330 comprises TbCo. The second sublayer can be a layer of TbCo having about 25 atomic percent Tb and about 75 atomic percent Co. The second sublayer 336 could be for example 20 to 30 atomic percent Tb and 70 to 80 atomic percent Co. The second sublayer 336 can have a thickness of 20 to 60 Angstroms.

TbCo is a ferrimagnetic material, which means that the Tb atoms tend to align magnetically antiparallel to the Co atoms within the material. The result of this is that TbCo has a very high coercivity Hc, and a low magnetic moment. The magnetic moment of the material is the difference between the magnetic moments of the two materials Tb and Co within the material. This high coercivity of TbCo in the AP2 layer 330, advantageously increases the coercvity of the pinned layer 304, which prevents amplitude flipping as discussed.

As mentioned above, the magnetic thicknesses of the AP1 and AP2 layers should be substantially equal, or nearly so. Magnetic thickness is the product of the magnetic moment of a layer and the physical thickness. As mentioned, TbCo has a low moment, much lower than that of CoFe. Therefore, the TbCo can layer can be very thick to equal a given thickness of CoFe. In fact the magnetic moment of TbCo is about 1/10 that of CoFe. This is the reason that, as discussed above, if the AP1 layer 328 is made 20 Angstroms thick, and the first sublayer 334 of the AP2 layer 330 is made 15 Angstroms thick, the TbCo second sublayer would be 5×10 or 50 Angstroms thick.

TbCo is amorphous and therefore it may not be desirable to place this material under the sensor stack 301. For this reason it is preferable that the TbCo second sublayer 336 be constructed at the top of the sensor rather than at the bottom. If the pinned 304 were disposed at the bottom of the sensor (ie. deposited before the free layer), and the TbCo layer were deposited at the bottom of the pinned layer 302, an undesirable epitaxial growth would initiate in the other layers of the sensor stack 301. This the reason that the presently described embodiment illustrates the pinned layer 304 being at the top of the sensor rather than the bottom as is commonly done in sensor design. However, TbCo may be fine for use under a Tunnel Valve stack for providing pinning to the pinned layer.

Figure 4:
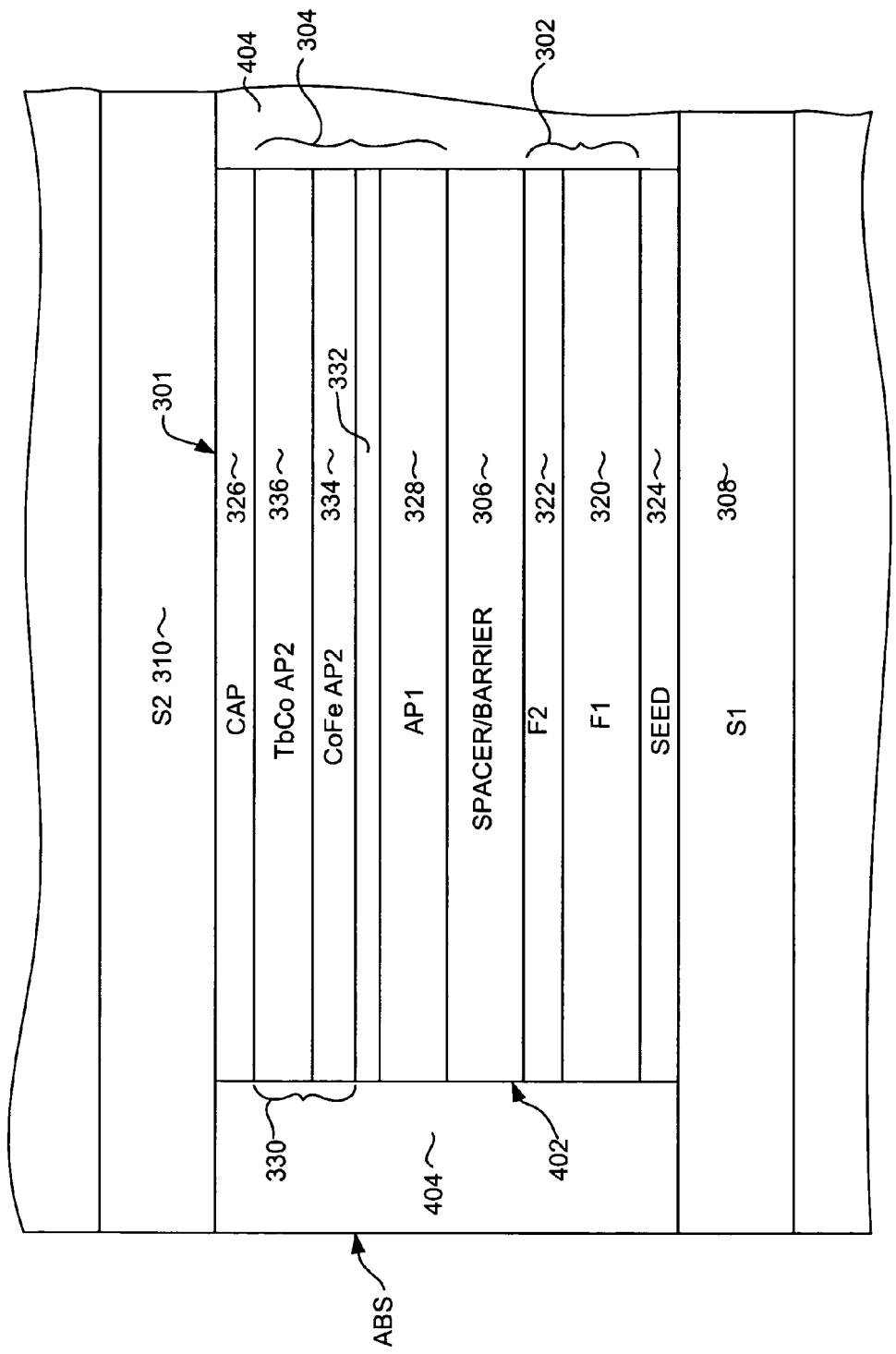
FIG. 4 is a cross sectional view taken from line 4-4 of FIG. 3.

With reference now to FIG. 4, a cross section perpendicular to the ABS of the sensor 300 can be seen. As can be seen the sensor stack 301 has a front edge 402 that is recessed from the ABS. The shields 308, 310 extend beyond the front edge 402 of the sensor stack 301 and extend to the ABS. A fill layer 404 of non-corrosive, non-magnetic, dielectric material such as $Al_2O_3$ fills the area in front of the sensor 301 between the shields. TbCo is a corrosive material. Similarly, other materials making up the sensor stack are corrosive as well, although to a somewhat lesser degree. By recessing the sensor stack 301 and filling the space in front of the sensor with a dielectric material as described above, the sensor will be protected from corrosion, such as by might otherwise occur from atmospheric exposure. Prior art sensors have been constructed by lapping the sensor stack at the ABS surface until a desired stripe height is achieved. However, to construct the recessed sensor 300 of the presently described embodiment, the front edge of the sensor stack 404 (and therefore the stripe height) must be defined photolithographically. The dielectric fill material 402 is deposited and planarized before forming the second shield 310. A lapping procedure is then performed to remove shield material 301 and fill material 404, thereby defining the ABS. The amount of recess is controlled by monitoring sensor resistance (in the presence of a magnetic field) while performing the lapping procedure and terminating the lapping when a predetermined resistance is reached.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetoresistive sensor, comprising:
   a free layer;
   a pinned layer structure; and
   a spacer layer sandwiched between said free layer and said pinned layer structure;
   said pinned layer structure further comprising:
      a first magnetic (AP1) layer;
      a second magnetic (AP2) layer; and
      a non-magnetic antiparallel coupling layer;
      said AP1 and AP2 layers being antiparallel coupled across said non-magnetic antiparallel coupling layer;
      wherein said (AP2) layer comprises a first sub-layer comprising a magnetic material and a second sub-layer comprising TbCo,
      wherein said AP1 layer and said AP2 layer have magnetic thicknesses that are the same.

2. A magnetoresistive sensor as in claim 1, wherein said first sublayer of said AP2 layer comprises CoFe.

3. A magnetoresistive sensor as in claim 1, wherein said first sub-layer of said AP2 layer is disposed adjacent said non-magnetic coupling layer and said second sub-layer is disposed further from said non-magnetic spacer layer as compared with said first sub-layer.

4. A magnetoresistive sensor as in clam 1, wherein said pinned layer is formed above said free layer after formation of said free layer.

5. A magnetoresistive sensor as in claim 1 wherein said AP2 layer is formed above said AP1 layer after formation of said AP2 layer.

6. A magnetoresistive sensor as in claim 1 wherein said pinned layer structure and said free layer structure are formed by processes that include a deposition process and wherein said pinned layer is deposited after depositing said free layer.

7. A magnetoresistive sensor as in claim 1 herein:
   said AP1 layer has a thickness of 15 to 25 Angstroms;
   said first sublayer of said AP2 layer has a thickness of 10 to 20
   Angstroms; and
   said TbCo has a thickness of 20 to 60 Angstroms.

8. A magnetoresistive sensor as in claim 1 wherein:
   said AP1 layer has a thickness of about 20 Angstroms;
   said AP2 first sublayer has a thickness of about 15 Angstroms, and
   said AP2 second sublayer has thickness of 20 to 60 Angstroms.

9. A magnetoresistive sensor as in claim 1 wherein said second sublayer comprises about 25 atomic percent Tb and about 75 atomic percent Co.

10. A magnetoresistive sensor as in claim 1 wherein said second sublayer comprises 20 to 30 atomic percent Tb and 70 to 80 atomic percent Co.

11. A magnetoresistive sensor as in claim 1 wherein said sensor is a current perpendicular to plane (CPP) giant magnetoresistive (GMR) sensor.

12. A magnetoresistive sensor as in claim 1, further comprising:
   a first electrically conducive, magnetic layer electrically connected with said free layer; and
   a second electrically conductive, magnetic layer electrically connected with said pinned layer.

13. A magnetoresistive sensor as in claim 1 wherein said free layer comprises CoFe.

14. A magnetoresistive sensor as in claim 1 wherein said AP1 layer comprises CoFe.

15. A magnetoresistive sensor, comprising:
   a free layer;
   a pinned layer structure; and
   a non-magnetic electrically insulating barrier layer;
   said pinned layer structure further comprising:
      a first magnetic (AP1) layer;
      a second magnetic (AP2) layer; and
      a non-magnetic a antiparallel coupling layer;
      said AP1 and AP2 layers being antiparallel coupled across said non-magnetic antiparallel coupling layer;
      wherein said (AP2) layer comprises a first sublayer comprising
      a magnetic material and a second sub-layer comprising TbCo,
      wherein said AP1 layer and said AP2 layer have magnetic thicknesses that are the same.

16. A magnetoresistive sensor as in claim 15, wherein said first sublayer comprises CoFe.

17. A magnetoresistive sensor as in claim 15, wherein said AP1 layer comprises CoFe.

18. A magnetic data recording system, comprising:
   a magnetic medium;
   a slider;
   an actuator connected with said slider to locate slider adjacent to said magnetic medium; and a magnetic head attached to said slider said magnetic head including a magnetoresistive sensor, further comprising:
   a free layer;
   a pinned layer structure; and
   a spacer layer sandwiched between said free layer and said pinned layer structure;
   said pinned layer structure further comprising;
      a first magnetic (AP1) layer;
      a second magnetic (AP2) layer; and
      a non-magnetic antiparallel coupling layer;
      said AP1 and AP2 layers being antiparallel coupled across said non-magnetic antiparallel coupling layer;
   wherein said (AP2) layer comprises a first sub-layer comprising a magnetic material and a second sub-layer comprising TbCo,
   wherein said AP1 layer and said AP2 layer have magnetic thicknesses that are the same.

* * * * *

UNITED STATES PATENT AND TRADEMARK OFFICE
CERTIFICATE OF CORRECTION

PATENT NO. : 7,248,447 B2
APPLICATION NO. : 10/840452
DATED : July 24, 2007
INVENTOR(S) : Gill It is certified that error appears in the above-identified patent and that said Letters Patent is hereby corrected as shown below:

In the claims:
col. 8, line 1 change "clam 1" to --claim 1--;
col. 8, line 12 change "herein:" to --wherein:--;
col. 8, line 50 change "a non-magentic a antiparallel" to --a non-magnetic antiparallel--;
col. 9, line 8 change "further comprising;" to --further comprising:--.

Signed and Sealed this

Sixth Day of November, 2007

JON W. DUDAS
*Director of the United States Patent and Trademark Office*